United States Patent
Booth et al.

(10) Patent No.: US 9,048,711 B2
(45) Date of Patent: Jun. 2, 2015

(54) FIELD STRUCTURE OF AN ELECTRICAL MACHINE

(75) Inventors: James Kenneth Booth, Brande (DK); Uffe Eriksen, Horsens (DK); Bo Nedergaard Jacobsen, Odder (DE); Rune Nielsen, Ikast (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 316 days.

(21) Appl. No.: 13/563,885

(22) Filed: Aug. 1, 2012

(65) Prior Publication Data

US 2013/0033142 A1 Feb. 7, 2013

(30) Foreign Application Priority Data

Aug. 1, 2011 (EP) .................................. 11176152

(51) Int. Cl.
*H02K 1/27* (2006.01)
*H02K 7/18* (2006.01)

(52) U.S. Cl.
CPC ........... *H02K 1/276* (2013.01); *Y10T 29/49009* (2015.01); *H02K 1/278* (2013.01); *H02K 1/2786* (2013.01); *H02K 7/1838* (2013.01); *H02K 2201/06* (2013.01); *H02K 2213/03* (2013.01); *Y02E 10/725* (2013.01)

(58) Field of Classification Search
CPC ............................... H02K 1/278; H02K 1/276
USPC ............. 310/156.12, 156.13, 156.48, 156.49, 310/156.59
See application file for complete search history.

(56) References Cited

U.S. PATENT DOCUMENTS

| | | | |
|---|---|---|---|
| 5,397,951 A * | 3/1995 | Uchida et al. ............ | 310/156.21 |
| 6,911,756 B1 * | 6/2005 | Chang ....................... | 310/156.01 |
| 7,545,067 B2 * | 6/2009 | Drexlmaier ............... | 310/156.13 |
| 8,063,531 B2 * | 11/2011 | Clark ........................ | 310/156.28 |
| 2002/0074876 A1 * | 6/2002 | Campbell et al. ............... | 310/74 |
| 2006/0017342 A1 | 1/2006 | Park | |
| 2011/0175480 A1 * | 7/2011 | Booth et al. ............. | 310/156.13 |

FOREIGN PATENT DOCUMENTS

| | | |
|---|---|---|
| DE | 102005033561 A1 | 1/2007 |
| EP | 0866540 A2 | 9/1998 |
| EP | 2333933 A1 | 6/2011 |
| EP | 2348619 A1 | 7/2011 |
| JP | 2011062078 A | 3/2011 |
| WO | WO 2010078840 A1 | 7/2010 |

\* cited by examiner

*Primary Examiner* — Hanh Nguyen

(57) ABSTRACT

A field structure of an electrical machine includes a plurality of field slots. Each field slot extends from a first surface of the field structure into the body of the field structure. Each filed slot also has a T-shaped cross-sectional area dimensioned to accommodate a magnet pole assembly comprising a corresponding cross-sectional area.

10 Claims, 3 Drawing Sheets

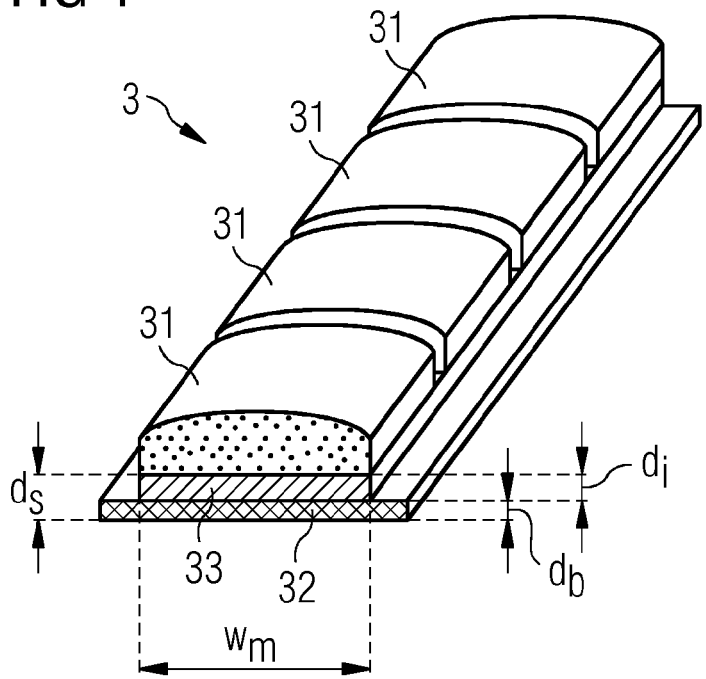
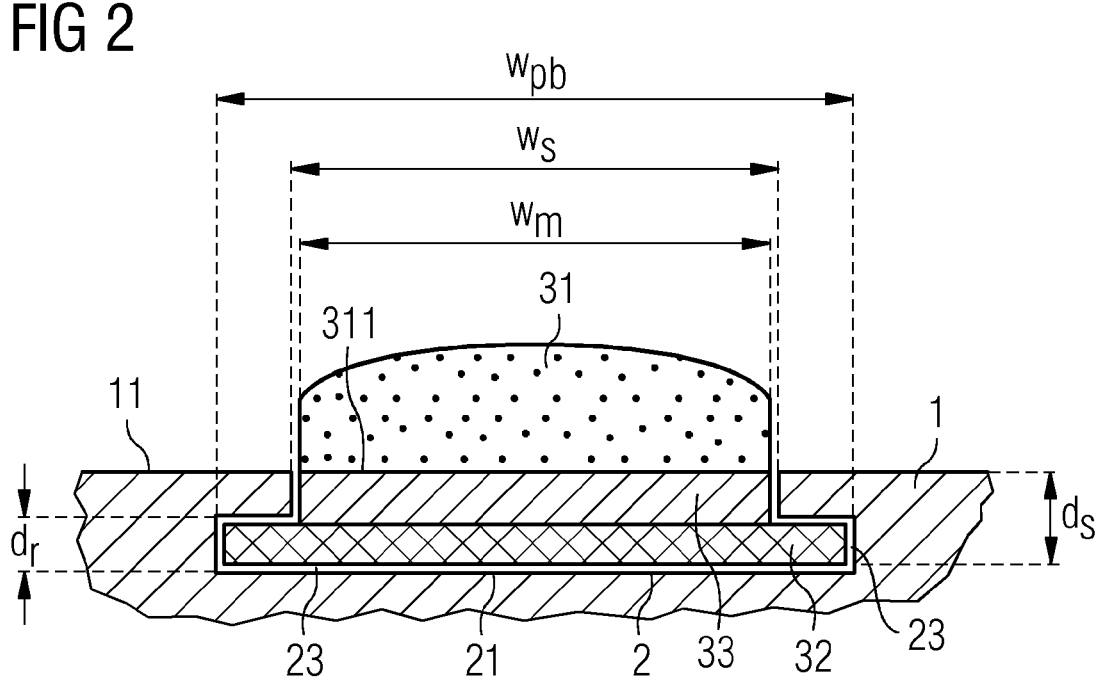

FIELD STRUCTURE OF AN ELECTRICAL MACHINE

CROSS REFERENCE TO RELATED APPLICATIONS

This application claims priority of European Patent Office application No. 11176152.4 EP filed Aug. 1, 2011. All of the applications are incorporated by reference herein in their entirety.

FIELD OF INVENTION

The illustrated embodiments relate to a field structure of an electrical machine, a magnet pole assembly, an electrical machine, and a method of forming a T-shaped field slot in a field structure.

BACKGROUND OF INVENTION

Permanent magnets are often used in large electrical machines such as motors or generators. Such an electrical machine comprises two basic components, namely a field for creating magnetic flux, and an armature for generating electromotive force and for carrying current crossing the field. The armature usually comprises conductive coils wrapped on a stator, while the field usually comprises magnets arranged on a rotor. The rotor can surround the stator, or vice versa, and the magnets and coils face each other across a narrow air gap. The established methods of loading or mounting permanent magnets onto the field (or 'field structure') of an electrical machine comprise various steps such as enclosing the individual permanent magnet poles in housings, and gluing the permanent magnet poles to the field (usually the rotor), wrapping the entire arrangement in fibreglass bandage or enclosing it in a vacuum bag, pumping resin into the bag and performing vacuum extraction to consolidate the permanent magnet poles to the rotor body. These methods are accompanied by various problems such as the extensive and therefore costly effort involved in securing the permanent magnets to the field. For example, when the magnets are glued to the field, the glue must be allowed to cure or set, adding to the overall assembly time. Furthermore, in case of a failure of a permanent magnet, the defective magnet must be removed and replaced, which is made difficult if a fibreglass or resin envelope must be opened and then resealed again, making repairs complicated and costly to carry out.

The permanent magnet poles—which can be several meters in length and correspondingly heavy—are usually already magnetized before they are mounted onto the field. Therefore, these can be strongly attracted to other permanent magnets of opposite polarity already in place on the field, or to other loose magnetic items such as tools or fasteners. Therefore, permanent magnets present a considerable safety hazard during the mounting procedure. For these reasons, handling of the permanent magnets requires special machinery and tools and very strict work-flow control to avoid potentially hazardous situations. An alternative approach, involving first loading the magnets onto the field and then magnetizing them, would avoid the hazardous manual handling but would be very costly and therefore impracticable to implement.

One possible solution involves arranging a number of holding or gripping elements onto an inner surface of the field, such that these can hold a magnet pole in place. The holding elements can be designed to allow the magnet pole to be pushed in from the side. The holding elements must be robust enough to withstand the strong magnetic forces acting on the permanent magnets. Such a design is therefore associated with a number of drawbacks, such as the need to attach many relatively robust and therefore heavy holding elements to the rotor surface that add to the overall weight of the rotor. Furthermore, the holding elements need to extend beyond the upper surface of the magnets in order to effectively hold them in place, and this might require a wider air gap.

For the above-mentioned reasons, the prior art methods of mounting permanent magnets to a field of an electrical machine are hazardous and difficult to carry out, present problems during maintenance, or involve costly machining steps.

SUMMARY OF INVENTION

It is an object of the illustrated embodiments to provide a better way of securing magnet poles on the field structure of an electrical machine, overcoming at least some of the problems mentioned above.

The object is achieved by the features of the independent claims.

In one embodiment, the field structure of an electrical machine comprises a plurality of field slots, wherein a field slot extends from a first surface of the field structure into the body of the field structure, and wherein a field slot comprises a T-shaped cross-sectional area dimensioned to accommodate a magnet pole assembly comprising a corresponding cross-sectional area.

Here, a sans-serif letter T may be visualized. The term "cross-sectional area" is to be understood as the area of a cross-section taken laterally through the slot, i.e. over the width of the slot, in a direction orthogonal to a longitudinal axis of the essentially cylindrical field.

The field structure with its T-shaped slots has distinct features over the known field structures. One of the features is that the geometry of the T-shaped slot offers a favourably large surface area to act against a corresponding surface area of the magnet assembly, so that this can be securely held in place. Furthermore, since the T-shape geometry also allows a favourable amount of tolerance regarding a magnet assembly, a magnet assembly can easily be inserted into the T-shaped slot, or removed from the T-shaped slot if it needs to be replaced.

In one embodiment, the magnet pole assembly comprises a pole piece attached to a carrier, wherein at least part of the carrier is wider than the pole piece, and wherein the carrier comprises a T-shaped cross-sectional area dimensioned to fit into the T-shaped field slot of a field structure.

The simple T-shape cross-sectional shape allows the magnet assembly to be constructed using economical components, for example a simple rectangular carrier plate made of steel. Then, viewed in cross-section, the body of the magnet presents the "stem" of the letter T and a wider carrier plate presents a "crossbar" of the letter T. Since such a carrier plate might be an easily available standardized part, a magnet assembly as described above can be particularly economical to manufacture.

In one embodiment, the electrical machine comprises an armature structure and a field structure as described above, and a plurality of magnet pole assemblies as described above arranged in the field slots of the field structure.

In one embodiment, the method of forming a T-shaped field slot in a field structure of an electrical machine comprises the steps of removing material of the field structure along a longitudinal length of the field structure over a slot width to form a trench with a planar base and inclined lateral sides, wherein the width of the planar base of the trench is less than the slot width;

removing further material of the field structure such that the width of the planar base is essentially equal to the slot width; and removing further material of the field structure and extend the planar base by forming a lateral recess along each side of the trench such that the width of the planar base is wider than the slot width.

Material of the field structure can be removed by any suitable process such as milling or grinding. In the second step, in which the width of the planar base is formed to be essentially equal to the slot width, the "stem" of the sans-serif letter T is formed, whereby this "stem" may be perpendicular to the planar base. In the third step, the lateral recesses are formed to extend outward from the stem and give the "crossbar" of the sans-serif letter T. Of course, the "stem" will be relatively wide, and the "crossbar" relatively short, and any reference to a letter T is only intended as a descriptive aid. This T-shape is relatively economical to mill or grind in the stages listed above, since some degree of tolerance between the slot and a magnet assembly is desirable and a high degree of accuracy is therefore not required. Furthermore, fluctuations in tolerance along the length of the slot will not detract from the function of the slot. For at least these reasons, the above described method is favourably economical to perform.

Specific embodiments and features are set forth by the dependent claims, as revealed in the following description. Features described in the context of one claim category can apply equally to another claim category. Features of the different claim categories may be combined as appropriate to arrive at further embodiments.

As indicated above, the field of an electric machine may be stationary or it may rotate. However, particularly in electrical generators, the coils are arranged on a stator, and the magnets are arranged on a rotor. Therefore, without restricting the invention in any way, the terms "rotor" and "field structure" or "field" may be used interchangeably in the following. The rotor may be arranged in the interior of the stator, or vice versa, so that the magnets are separated from the coils by a narrow air gap. In the following, but without restricting the invention in any way, it may be assumed that the rotor is arranged around the stator, i.e. outside the stator, and that the magnets are arranged on an interior or inner concave surface of the rotor. Such an arrangement allows a favourably large generator diameter and an associated high power. For simplicity, in the following the terms "magnet pole pieces" or "magnet poles" may be referred to simply as "pole pieces" or "poles" respectively. Also, it may be assumed that the rotor has an essentially cylindrical shape, and that a field slot is arranged essentially longitudinally on the rotor, i.e. essentially parallel to a longitudinal axis or axis of rotation of the rotor.

In one embodiment, to facilitate a quick mounting or loading of the rotor with the magnet assemblies, in one embodiment a rotor slot comprises a slot width at the first or inner surface of the rotor (using the example of an outside rotor arranged around a stator), which slot width is at least as wide as a pole piece of a magnet pole assembly to be arranged in the rotor slot, but only slightly wider than the magnet pole piece. The T-shaped rotor slot may be formed to provide a gap of at most 5 mm, more particularly for example at most 2 mm, even more particularly for example at most 0.5 mm between the field slot and the body of a magnet pole assembly arranged in the field slot. This slight gap between slot and magnet assembly is sufficient to provide a degree of tolerance and to accommodate for a thermal expansion of the base and/or pole piece during operation of the machine, while also allowing the magnet assembly to be easily inserted into or removed from the slot should the need arise. Of course, the gap may vary slightly about different parts or regions of the magnet pole assembly. For example, a gap between the groove and the upper surface of the base plate along its exposed long edge may be different than a gap between a longitudinal side surface of the magnet pole and a long side edge of the rotor slot.

It is desirable that the magnets are held securely in the slots during operation of the electrical machine. In a further embodiment, a field slot comprises a planar base, which planar base is wider than the slot width by at least 2% of the slot width. This difference in width, resulting in a longer "crossbar" of the letter T, offers a favourably large contact area between the interior slot surfaces and the outer surfaces of a magnet assembly placed in the slot. The T-shape geometry of the rotor slot in a rotor therefore provides improved physical contact compared to, for example, an angular or dovetail geometry for a slot/magnet assembly.

In a further embodiment, a rotor slot extends from a first side of the rotor to a second side of the rotor, and terminates before reaching the second side. For example, the rotor slots can be formed to extend from the brake disk side of the rotor to the hub side, and can terminate at a distance from the hub side, so that the rotor slots are closed at the hub side and open at the brake disk side. In this way, the magnet poles are already fixed at one end, namely the closed hub end, and do not need to be secured in an additional step. Generally, a brake disk is screwed or bolted to the brake disk side of the rotor, so that this can act to hold the magnets in the rotor slots. In one embodiment, the magnet pole of a slot can be secured in place by any suitable means such as a terminating element such as a steel plate glued or otherwise held in place between the end of the magnet pole and a brake disk screwed onto that end of the rotor, so that there is no "empty space" in the rotor slot between the end of the magnet pole and the edge of the rotor.

In one embodiment, the magnet assembly may be shaped to fit securely into the T-shaped slot of the rotor. However, shaping the magnet itself to fit the T-shaped slot would be impracticable for various reasons that will be clear to the skilled person. In one embodiment, the carrier comprises a base plate dimensioned according to the planar base of the field slot. The magnet pole piece can be attached to the base plate, for example using fasteners, or by adhesive bonding.

The carrier can be manufactured as a single part. Therefore, in order to ensure that the underside of the magnet pole piece is in line with the surface of the rotor, such a one-piece carrier plate might be milled to obtain a T-shape, with wider outer edges for fitting into lateral grooves or recesses of a T-shaped rotor slot, and a narrower area for supporting the magnet pole piece, which narrower area is narrower than the "stem" of the T-shaped rotor slot. However, such a T-shaped one-piece carrier must be milled or machined to obtain the desired shape, and would add to the overall costs of the electrical machine. Therefore, in one embodiment, the carrier comprises an intermediate plate arranged between the base plate and the pole piece. In such an embodiment, both base plate and intermediate plate can be simple rectangular plates, and can be connected using any cost-effective technique such as welding, bolting, or adhesive bonding. An advantage of the intermediate plate is that the magnet pole piece can be effectively raised by an amount given by the thickness of the intermediate plate, so that an air gap between the magnet pole piece and the stator coils can be kept favourably narrow.

The intermediate plate can be narrower in width than a magnet pole piece, for example to reduce the amount of steel being used. However, such a narrow intermediate plate therefore offers less surface area for attachment to the magnet pole piece, any may be insufficient to secure the magnet against the strong forces acting on it. The width of the intermediate plate may correspond to the width of the pole piece, so that the intermediate plate is almost as wide as the stem of the T-shaped slot.

The thickness of the intermediate plate can be any suitable thickness that allows a secure bonding to the base plate and the magnet pole piece. A thinner intermediate plate might then be used to arrange the magnet pole pieces in a recessed manner in the rotor slots. Alternatively, a thicker intermediate plate might be used to raise the lower level of the magnet pole pieces above the rotor surface. However, in one embodiment, the height of the intermediate plate is such that a pole piece surface attached to the carrier is arranged essentially at the level of the inner surface of the rotor when the magnet pole assembly is arranged in a rotor slot of the rotor. In other words, the base of the magnet pole piece is neither lower nor higher than the inner rotor surface. Such an arrangement has been shown to provide a homogenous magnetic field that induces a favourably smooth sinusoidal voltage and current in the stator coils, and this arrangement therefore improves the generator performance. An arrangement in which the base of a magnet pole is situated above the surface of the field results in a less than optimal design, since it is associated with a waste of material and an unfavourable air gap. In an arrangement with the base of the magnet pole being lower than the field outer surface, the flux generated will not flow optimally with respect to the rotor, and the generator will therefore run less efficiently.

Various steps can be taken to optimise the performance of an electrical machine. For example, design parameters can be adjusted to reduce cogging torque. In one embodiment, a rotor slot is arranged at a skewing angle relative to a longitudinal axis of the field structure. Instead of the magnet pole pieces of a magnet pole synchronously passing a stator coil, which would be the case for rotor slots arranged parallel to the axis of rotation or a longitudinal axis of the rotor, the magnet pole pieces of a pole pass the stator coil in a staggered manner. This results in a favourable reduction in ripple torque and cogging torque, giving a smoother generator operation. A small offset or skewing angle is sufficient to obtain this improvement in behaviour. For example, for a rotor with a diameter of 3 meters, a length of 1 meter and having 96 rotor slots, an offset of 30 mm between outer ends of a rotor slot corresponds to a skewing angle of about 1.7°, and such a skewing angle has been found to deliver a favourable reduction in cogging torque.

The base or floor of such a diagonal or skewed rotor slot is not uniform (as is the case for a 'straight' rotor slot). For a rotor with magnets arranged on the interior, and taking the middle of a rotor slot as reference, the outer ends of the rotor slot will be slightly higher than in the middle. Furthermore, at one end of the rotor, the slot floor will be tilted or slanted in one direction (for example to the left), while at the other end of the rotor, the slot floor will be tilted in another direction (for example slightly to the right). This means that, if the same type of carrier is used for all pole pieces in the same slot, the surface of the magnet facing into the air gap will be irregular and an erratic magnetic field may be the result. In one embodiment, when skewed rotor slots are to be used, the carrier comprises a wedge-shaped intermediate plate arranged on the base plate such that the pole piece is tilted relative to the base of the carrier, in order to compensate for the curvature of the rotor slot. In this way, the underside of the magnet pole piece can still be arranged essentially in line with the inner surface of the rotor, so that a magnet pole piece is always arranged at essentially right angles to a stator coil. This ensures a homogenous magnetic field, with field lines travelling essentially at right angles to opposing surfaces of the rotor and stator.

The rotor structure described herein is particularly suited for use in a large electrical machine such as a wind turbine generator. In particular, the rotor structure and the magnet assembly are suited for a direct-drive wind turbine generator, for example a direct-drive wind turbine for operating at a relatively low rotational speed of about 10 rpm. The design of a direct-drive turbine has the advantages, in contrast to a traditional geared wind turbine, that complex, heavy, and failure-prone components and complex lengthy cabling can be dispensed with. Furthermore, maintenance and repair—which can be costly for an offshore generator located in a nacelle at great height—are much simpler (and therefore cheaper) in a direct-drive generator. The rotor structure is associated with a favourably low weight of the individual components. Furthermore, the assembly or magnet loading is very simple, and the air gap is optimally formed while also allowing a favourably small rotor outer diameter.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and are not meant to be limiting.

FIG. 1 shows a magnet assembly according to a first embodiment, in a T-shaped slot of a rotor structure;

FIG. 2 shows another view of the magnet assembly of FIG. 1;

DETAILED DESCRIPTION OF INVENTION

Figure 3:
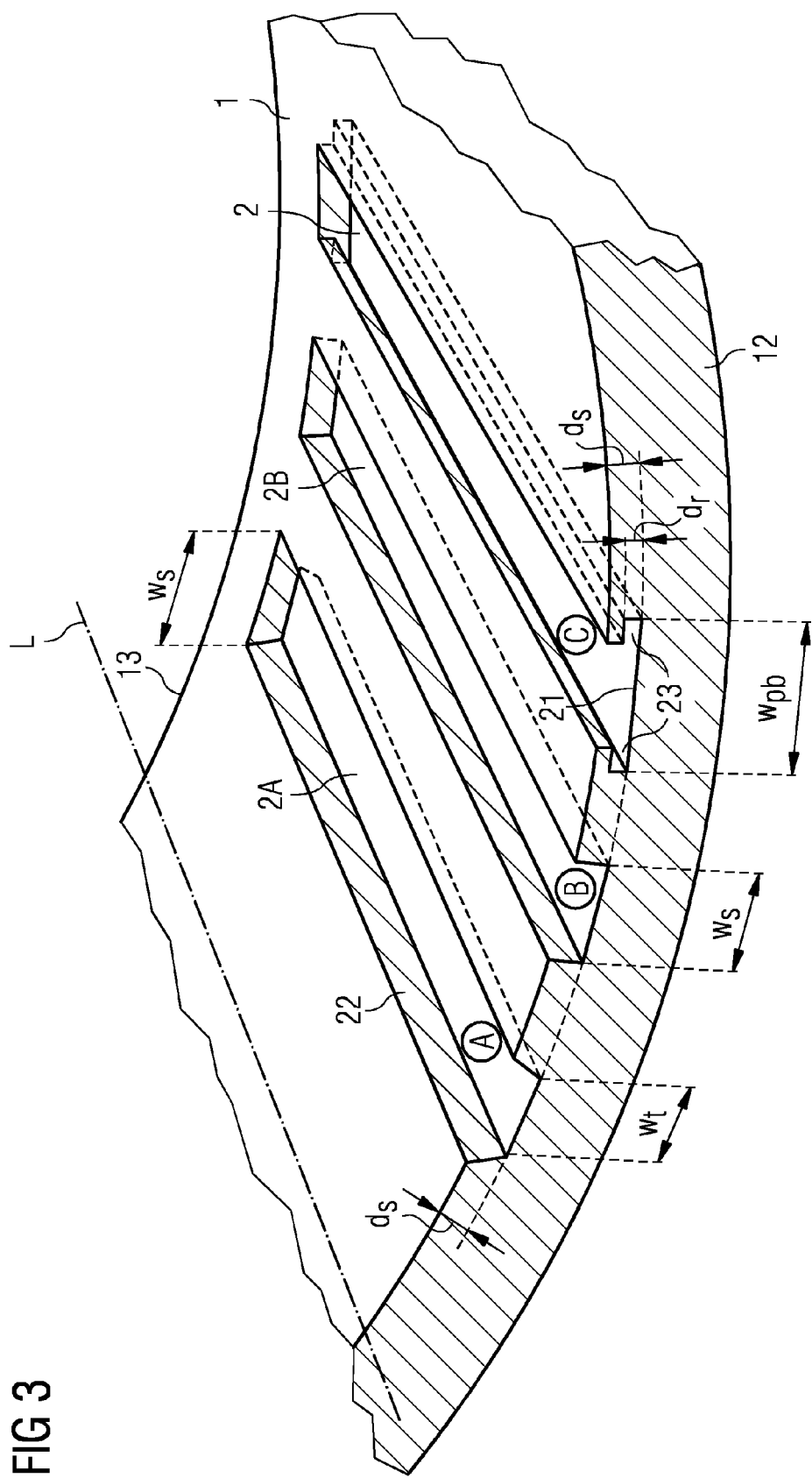
FIG. 3 illustrates stages in the method of forming a T-shaped slot in a rotor structure.

In the drawings, like reference numbers refer to like objects throughout. Objects in the diagrams are not necessarily drawn to scale. In particular, the relative length and width of a rotor slot or a magnet assembly may not correspond to those of actual embodiments of these elements, and are only rendered thus for clarity.

FIG. 1 shows a magnet assembly 3 according to a first embodiment. Here, the magnet assembly 3 comprises a base plate 32 on which is mounted an intermediate plate 33. Magnet pole pieces 31 are mounted on the intermediate plate 33. Here, four such pole pieces 31 are arranged on a carrier 32, 33, separated by a small air gap. Of course, this number is only exemplary. The intermediate plate 33 is spot welded to the base plate 32, whereby the welding points are located between neighbouring magnet pole pieces 31. The magnet arrangement can be sealed in a metal or epoxy cover (not shown here) to protect against corrosion and impact. The base plate 32 is wider than the magnet pole pieces 31 and the intermediate plate 33, so that a cross-section taken through the magnet assembly 3 appears as an upside-down, rather wide "T". For example, a magnet pole piece 31 with a width of 100 mm (please enter appropriate value) can be supported using a base plate 32 with a width of 110 mm. The magnet pole pieces 31 and the intermediate plate 33 have essentially equal widths $w_m$. The base plate 32 has a first thickness $d_b$, while the intermediate plate 33 has a second thickness $d_i$. In this realisation, the intermediate plate 33 is somewhat thicker than the base plate 32, having a thickness $d_i$ of 3.0 mm compared to the base plate thickness $d_b$ of 2.0 mm. The combined thickness $d_b+d_i$ of the intermediate plate 33 and the base plate 32 corresponds to the depth of rotor slot into which this magnet assembly 3 is to be inserted, as shown in FIG. 2, which shows a cross-sectional view of this magnet assembly 3 positioned in a T-shaped rotor slot 2 formed in the body of a rotor 1, which rotor slot 2 comprises recesses 23 to receive the outer long edges of the base plate 32. The T-shaped rotor slot 2 accommodates the T-shaped cross-sectional shape of the magnet assembly 3, being slightly larger all round than the magnet pole piece 31 and the base plate 31. A slot width $w_s$, a width $w_{pb}$ of a planar base 21 of the slot 2, a recess height $d_r$ of the recesses and the slot depth $d_s$ of the slot 2 can be chosen to give a T-shape rotor slot cross-sectional area that is slightly larger all round than the cross-sectional area of the magnet assembly 3. For example, a planar base width $w_{pb}$ of 115 mm and a recess height $d_r$ of 6 mm give a clearance between about 0.5 mm to 2.5 mm above and below the base plate 32. In this way, the magnet assembly 3 can be easily inserted into the slot 2 or pulled out again, while the dimensions of the T-shaped slot 2 with its large surface area are such that the magnet assembly 3 is firmly held in place. As mentioned above, the combined thickness $d_b+d_i$ of the intermediate plate 33 and the base plate 32 corresponds to the depth $d_s$ of rotor slot 2, so that the underside 311 of the magnet pole piece 31 lies flush or co-planar with the inner surface 11 of the rotor. Here, the term "inner surface" means the surface of the rotor 2 that faces the coils of the armature.

FIG. 3 illustrates stages in the method of forming a T-shaped slot 2 in a rotor structure 1. In a first stage A, a trench 2A is milled or ground by removing material from the rotor structure 1 in a longitudinal area parallel to a longitudinal axis L of the rotor 1, over a width $w_s$ corresponding to the desired width of the finished rotor slot. To keep the milling procedure simple, the trench 2A is initially formed with sloping sides 22, so that the width $w_t$ of the trench base is initially narrower than the slot width $w_s$ at the top of the trench 2A. In a second stage B, the sloping side walls of the trench 2B are milled further to make these essentially perpendicular to the trench base, thus widening the base of the trench 2B until this is as wide as the slot width $w_s$ at the top of the trench. In a third stage C, recesses 23 are milled into the rotor body along the long sides of the trench 2B to give the completed rotor slot 2. The milling and grinding steps are performed to obtain an essentially flat or planar base in the rotor slot 2. Furthermore, the rotor slot 2 can terminate some distance from an outer end of the rotor 1, typically the hub side 13 of the rotor. The rotor slot 2 is formed to open onto the other outer end of the rotor 1, typically at the brake disc side 12.

Figure 4:
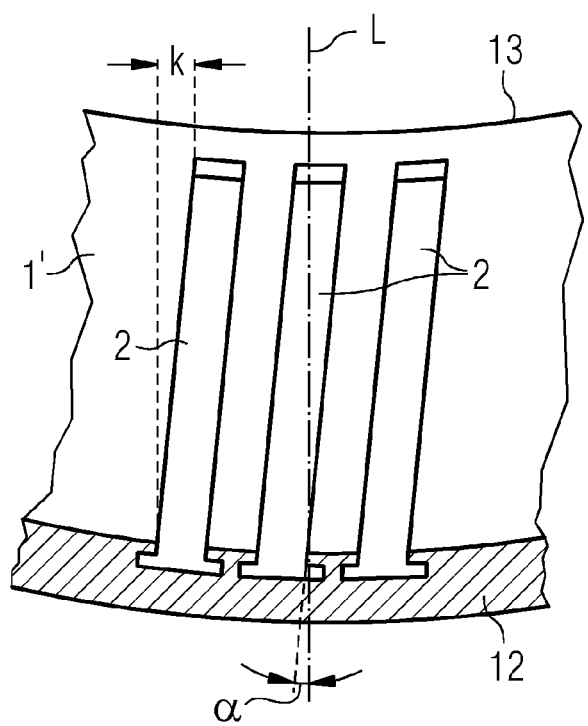
FIG. 4 shows a further embodiment of a rotor structure.
Figure 5:
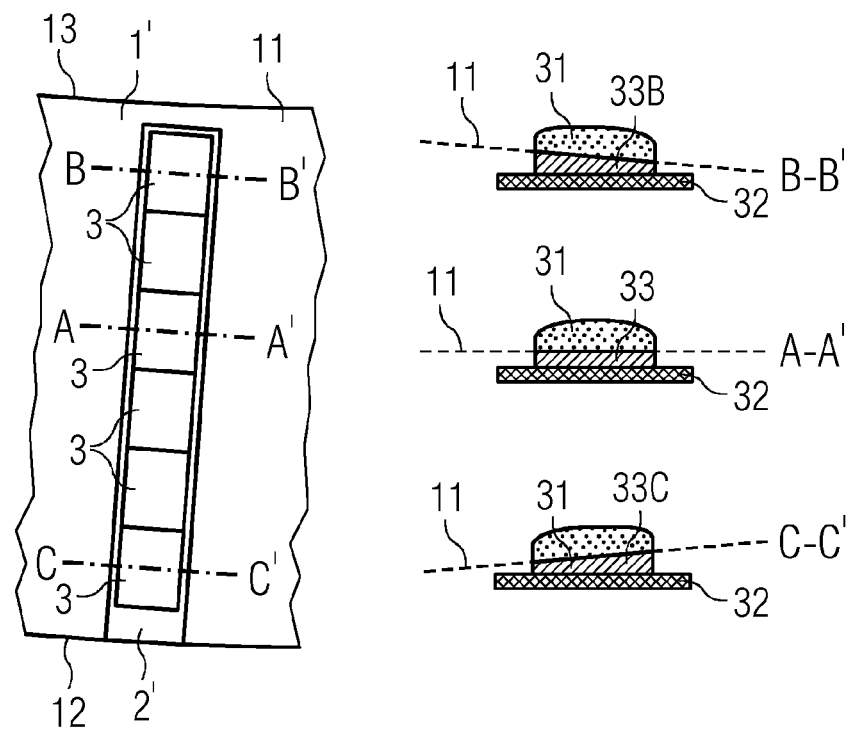
FIG. 5 shows a further embodiment of a magnet assembly.

FIG. 4 shows a further embodiment of a rotor structure 1'. Here, instead of forming rotor slots that run parallel to a longitudinal axis L, as described above, rotor slots 2' are formed at an angle α to the longitudinal axis L. The skewing angle α is chosen such that the ends of a rotor slot 2' are offset by an amount k, which can be about 40 mm for a rotor with a diameter of 3 m and a length of 1 m, in which 96 such rotor slots 2' are formed. Owing to the circular form of a rotor, the floor or base of such a skewed slot 2' will not be uniform. The rotor slot ends at the brake disk side 12 and the hub side 13 of the rotor 1' will be offset in height from the middle of the rotor slot 2', and will be slanted or tilted. Using the example of an outer rotor 1' for which the rotor slots 2' are formed in the interior, the floor or base of the rotor slot 2' will be higher at its outer ends than in the middle, and will be slanted to some degree. However, for favourable performance of the electrical machine, magnet pole pieces should always be arranged such that a perpendicular, extending through an upper or lower surface of the magnet pole piece, passes through the axis of rotation of the rotor. Therefore, in this realisation, the intermediate plate of the magnet assembly is shaped to compensate for the non-uniform base of the rotor slot 2'. FIG. 5 shows cross-sections A-A', B-B', C-C' taken at three points along the rotor slot 2'. In a central region, as indicated by the cross-section A-A', the intermediate plate 33 is simply a flat plate. At the hub side 13 of the rotor 1', the rotor slot 2' is offset and therefore slightly tilted. The intermediate plate 33B for the magnet assembly 3 arranged in this section of the rotor slot 2' is wedge-shaped to compensate for the tilted rotor slot floor. At the brake disk side 12 of the rotor 1', the rotor slot 2' is offset in the opposite direction and therefore slightly tilted, also in the opposite direction. The intermediate plate 33C for the magnet assembly 3 arranged in this section of the rotor slot 2' has a mirror-image wedge-shape to compensate for the changing inclination of the rotor slot floor. For both wedge-shaped intermediate plates 33B, 33C, the 'shorter' side can be as thick as the uniform intermediate plate 33 used in the central region of the slot 2', while the 'higher' side can be slightly higher, for example 0.9 mm higher, than the uniform intermediate plate 33. These thicknesses are shown in an exaggerated manner here, to clearly illustrate the differences between the various intermediate plates 33, 33B, 33C. Using such wedge-shaped plates 33B, 33C, the magnet pole pieces 31 lie essentially in the plane of the rotor inner surface 11, as indicated by the broken line, so that they are optimally positioned relative to the coils and the air gap. Of course, if shorter (and therefore more) magnet assemblies 3 are used in each slot 2', a greater number of differently shaped wedges would be required, instead of only the three shown here, but the resulting collective magnet surface would be correspondingly uniform.

Although the present invention has been disclosed in the form of specific embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A field structure of an electrical machine, comprising:
a plurality of field slots,
wherein each field slot extends from a first surface of the field structure into the body of the field structure,
wherein each field slot comprises a T-shaped cross-sectional area dimensioned to accommodate a magnet pole assembly comprising a corresponding cross-sectional area, and
wherein the field structure comprises a first side and a second side located longitudinally opposite to each other, wherein each field slot extends from the first side towards the second side, and wherein the field slot terminates at a distance from the second side.

2. The field structure according to claim 1, wherein each field slot has a slot width at the first surface of the field structure, which slot width is at least as wide as a pole piece of a magnet pole assembly to be arranged in that field slot.

3. The field structure according to claim 2, wherein each field slot comprises a planar base, which planar base is wider than the slot width.

4. The field structure according to claim 1, wherein each field slot is arranged at a skewing angle relative to a longitudinal axis of the field structure.

5. A magnet pole assembly, comprising:
a pole piece attached to a carrier,
wherein at least part of the carrier is wider than the pole piece, and
wherein the carrier comprises a T-shaped cross-sectional area dimensioned to fit into a T-shaped field slot of a field structure according to claim 1.

6. The magnet pole assembly according to claim 5, wherein the carrier comprises a base plate dimensioned according to the planar base of the field slot.

7. The magnet pole assembly according to claim 6, wherein the carrier comprises an intermediate plate arranged between the base plate and the pole piece.

8. The magnet pole assembly according to claim 7, wherein a width of the intermediate plate corresponds to a width of the pole piece.

9. The magnet pole assembly according to claim 7, wherein a thickness of the intermediate plate is such that a pole piece surface attached to the carrier is arranged essentially at the level of the first surface of the field structure when the magnet pole assembly is arranged in the field slot of the field structure.

10. The magnet pole assembly according to claim 7, wherein the carrier comprises a wedge-shaped intermediate plate arranged on the base plate such that the pole piece surface is tilted relative to a surface of the base plate.

* * * * *